United States Patent [19]

Klink

[11] Patent Number: 5,325,886

[45] Date of Patent: Jul. 5, 1994

[54] INFLATION AND PRESSURE INDICATOR APPARATUS FOR TIRES

[76] Inventor: James E. Klink, 2322 Peachtree Cir., Antioch, Calif. 94509

[21] Appl. No.: 42,670

[22] Filed: Apr. 5, 1993

[51] Int. Cl.$^5$ .................. B60C 23/04; F16K 37/00
[52] U.S. Cl. .................... 137/227; 137/232; 73/146.8; 116/34 R
[58] Field of Search ............ 137/227, 557, 232; 73/146.3, 146.8; 116/34 R; 152/415, 427

[56] References Cited

U.S. PATENT DOCUMENTS

| | | | |
|---|---|---|---|
| 1,517,484 | 12/1924 | Badowski | 73/146.3 X |
| 1,671,123 | 5/1928 | Payne | 137/227 X |
| 2,047,405 | 7/1936 | Byars | 137/227 |
| 2,569,120 | 9/1951 | Van Heuvel et al. | 73/146.8 X |
| 3,230,968 | 1/1966 | Struby | 137/227 |
| 3,592,218 | 7/1971 | Guy et al. | 137/227 |
| 3,720,224 | 3/1973 | Foxhall | 137/227 |
| 3,824,849 | 7/1974 | Foxhall | 73/146.8 |
| 4,193,295 | 3/1980 | Curran | 137/227 X |
| 4,239,184 | 12/1980 | Dudar | 137/232 X |
| 4,520,664 | 6/1985 | Kramer | 116/34 R X |
| 4,606,391 | 8/1986 | Achterholt | 137/227 X |
| 4,686,855 | 8/1987 | Smith | 73/146.8 |
| 4,779,457 | 10/1988 | Huang | 116/34 R X |
| 4,858,467 | 8/1989 | Weng | 116/34 R X |
| 5,044,197 | 9/1991 | Weng | 116/34 R X |

*Primary Examiner*—John Rivell
*Attorney, Agent, or Firm*—Thomas R. Lampe

[57] ABSTRACT

Apparatus for inflating a tire connected to a tire rim and indicating the pressure of a tire while the tire is on the rim includes an elongated body element for connection with the tire rim, an elongated valve element having indicia thereon slidably disposed within an elongated passageway within the elongated body element, a seal attached to the elongated valve element, and a spring for biasing the elongated valve element against movement toward an extended position. The elongated valve element is moveable to a fully retracted position within the elongated body element and allows pressurized air to flow between the elongated body element and the elongated valve element when the apparatus is used to fill a tire.

9 Claims, 3 Drawing Sheets

INFLATION AND PRESSURE INDICATOR APPARATUS FOR TIRES

TECHNICAL FIELD

This invention relates to apparatus for inflating a tire and for indicating the pressure of the tire.

BACKGROUND ART

My U.S. patent application Ser. No. 07/830,362, filed Jan. 31, 1992, discloses an apparatus for selective use either in operative association with an existing conventional valve stem or, alternatively, by being attached to a tire rim as a replacement for a conventional valve stem.

A number of other devices are known in the prior art which function as both tire valves and pressure gauges. Representative apparatus of this type are disclosed in the following U.S. Pat. No. 3,230,968, issued Jan. 25, 1966, U.S. Pat. No. 1,517,484, issued Dec. 2, 1924, U.S. Pat. No. 1,671,123, issued May 29, 1928, U.S. Pat. No. 4,606,391, Aug. 19, 1986, U.S. Pat. No. 3,720,224, issued Mar. 13, 1973, and U.S. Pat. No. 4,193,295, issued Mar. 18, 1980.

Combination tire valve and pressure indicator devices are typically characterized by their relative complexity and high expense.

DISCLOSURE OF INVENTION

The present invention relates to apparatus of relatively simple, inexpensive construction which may be utilize to both inflate a tire and indicate the pressure of the tire.

The apparatus includes an elongated body element for connection with the rim of the tire which defines an elongated passageway leading from the interior of a tire to which the elongated body element is connected to the ambient atmosphere.

An elongated valve element having indicia thereon is slidably disposed within the elongated passageway and moveable between an extended position wherein the elongated valve element extends at least partially out of the elongated body element to display the indicia on the elongated valve element and a fully retracted position wherein the elongated valve element is fully retracted into the elongated body element and does not extend outwardly therefrom.

Seal means is attached to the elongated valve element. The seal means engages the elongated body element when in the extended position and is disengaged from the elongated body element when in the fully retracted position.

Spring means is disposed within the elongated body element which is operatively associated with the elongated valve element for biasing the elongated valve element against movement toward the extended position.

The elongated passageway includes a restricted passageway segment and an enlarged passageway segment. Seal means is located within the confines of the enlarged passageway segment and defines an annular channel with the elongated body element when the seal means is in the fully retracted position to allow the flow of pressurized air into the interior of the tire to which the elongated body element is connected through the elongated passageway.

The elongated valve element has two spaced ends. The seal means comprises a flexible seal element affixed to one of the elongated valve element ends. The elongated valve element is displaced from the fully retracted position toward the extended position and the flexible seal element is brought into engagement with the restricted passageway segment when the pressure of pressurized air in the tire to which the elongated body element is connected exceeds the air pressure in the passageway at the other end of the elongated valve element.

The flexible seal element comprises a cup seal affixed to the elongated valve element and includes a flexible seal wall extending outwardly away from the elongated valve element and defining a cup-shaped recess spaced from the elongated valve element. The flexible seal wall engages the restricted passageway segment in a substantially fluid-tight manner when the elongated valve element is not in the fully retracted position.

The apparatus additionally comprises securement means for securing the mounting means at a predetermined location along the length of the elongated body element.

Other features, advantages, and objects of the present invention will become apparent with reference to the following description and accompanying drawings.

BEST MODE FOR CARRYING OUT THE INVENTION

Figure 1:
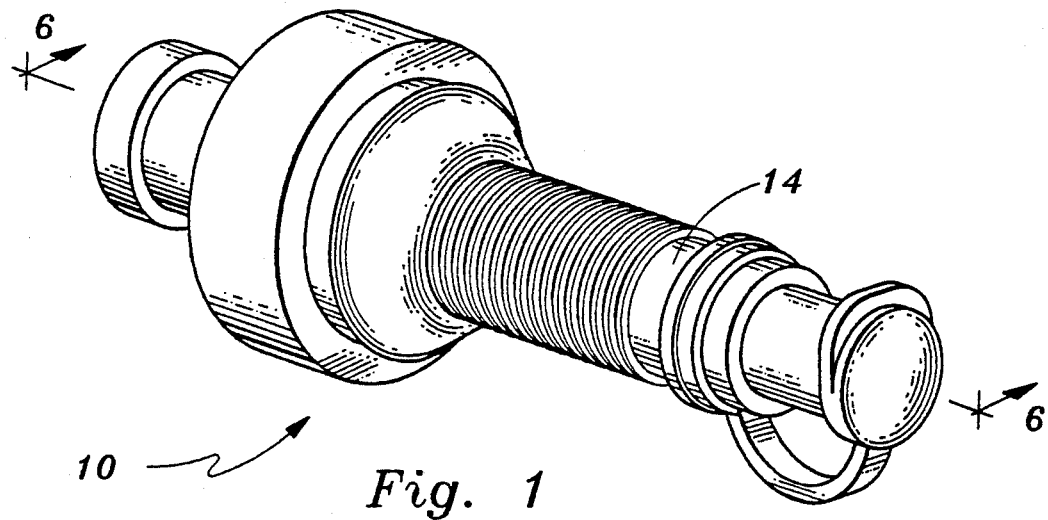
FIG. 1 is a perspective view of apparatus constructed in accordance with the teachings of the present invention.
Figure 2:
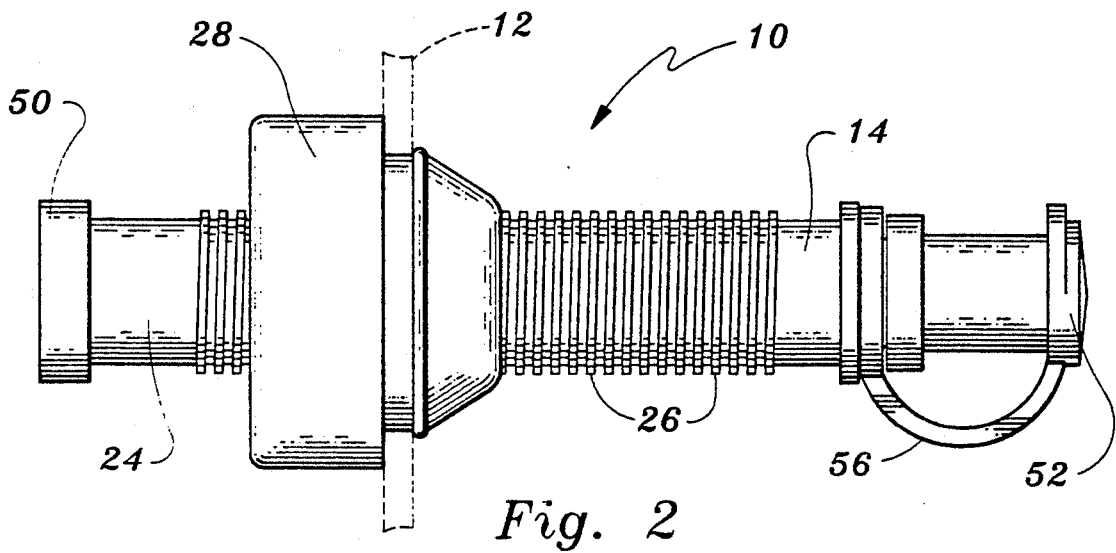
FIG. 2 is a front elevational view of the apparatus.
Figures 3, 4:
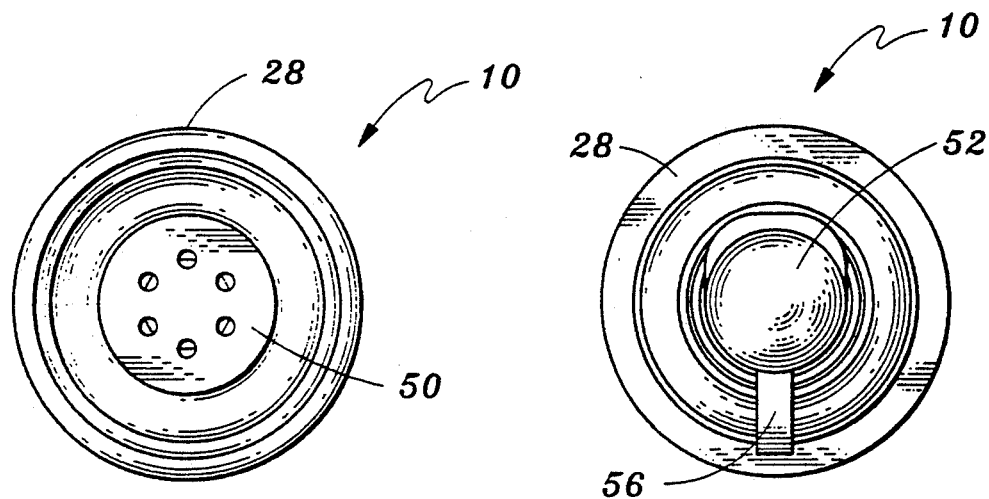
FIG. 3 is a left end elevational view of the apparatus.
FIG. 4 is a right end elevational view of the apparatus.
Figure 5:
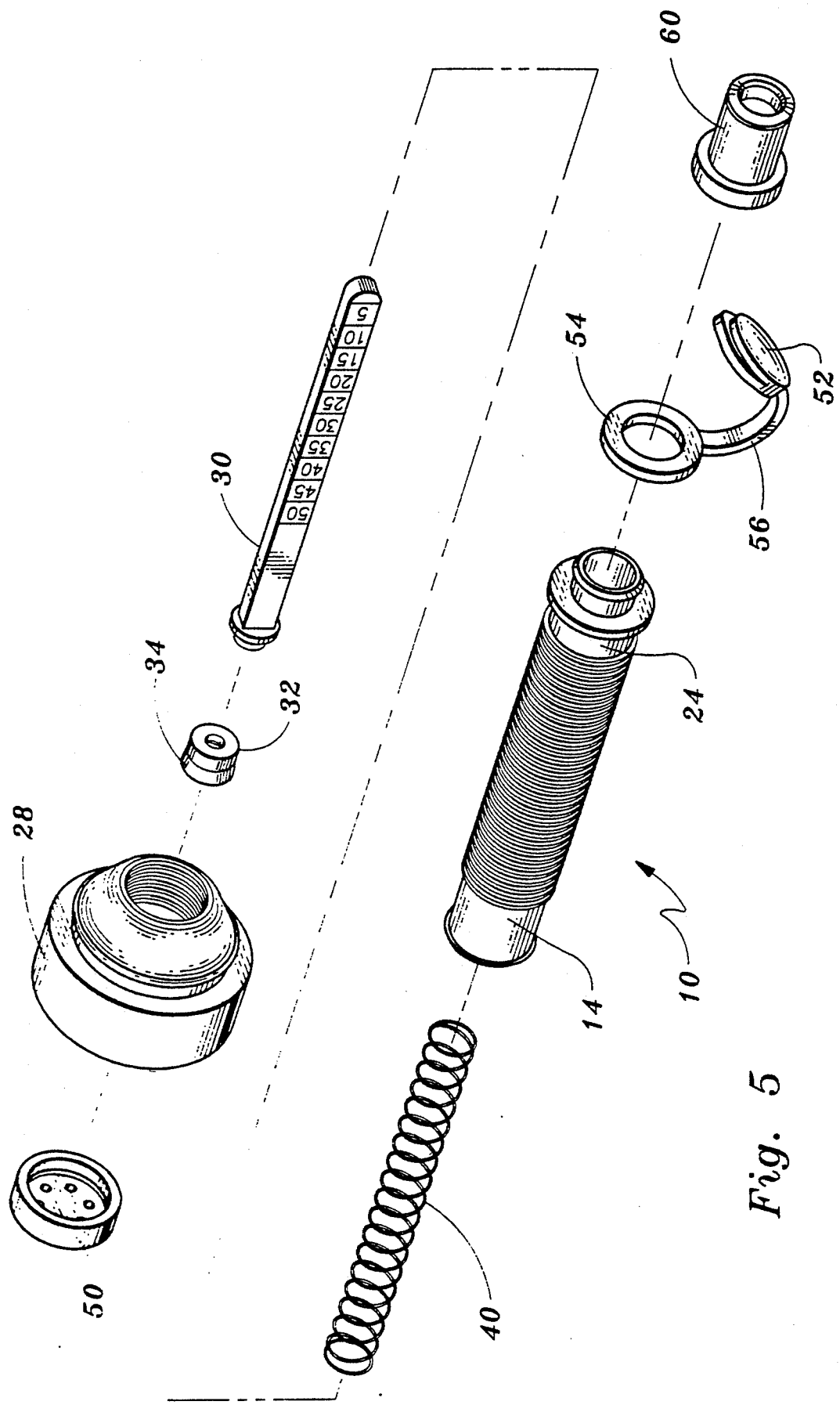
FIG. 5 is an exploded, perspective view illustrating the structural elements of the apparatus.

Referring now to the drawings, apparatus constructed in accordance with the teachings of the present invention is indicated generally by reference numeral 10. Apparatus 10 is for inflating a tire (not shown) connected to a tire rim (a portion of which is depicted by dash lines in FIG. 2 and identified by reference numeral 12). The apparatus indicates the pressure of the tire while the tire is on the rim.

Apparatus 10 includes a elongated body element 14 which may be formed of any suitable material such as molded plastic. The elongated body element 14 defines an elongated passageway 16 which leads from the interior of the tire to which the elongated body element is connected to the ambient atmosphere.

The elongated passageway 16 includes a restricted passageway segment 18 and an enlarged passageway segment 20 with the location of interconnection thereof being at a tapered wall 22.

Elongated body element 14 has an outer cylindrical surface 24. A plurality of spaced ribs 26 radiate outwardly from the elongated body element outer cylindrical surface along a portion of the length of the elongated body element.

A grommet 28 preferably formed of a resilient material such as plastic or rubber surrounds the elongated body element. The grommet 28 frictionally engages the ribs 26 but the grommet may be manually displaced and slid along the elongated body element to vary its position along the length thereof. This feature enables the apparatus to have different stem lengths when installed on tire rims. The grommet may be fixedly secured in any desired position relative to the elongated body element by being adhesively secured or heat sealed thereto. The grommet may, as shown, have spaced circular indents in the interior thereof to conform to the shapes of the ribs.

An elongated valve element 30 having indicia thereon to designate tire pressures is slidably disposed within the elongated passageway 16. The elongated valve element is moveable between an extended position wherein the elongated valve element extends at least partially out of the elongated body element to display the indicia on the elongated valve element (the condition shown in FIG. 8) and a fully retracted position (shown in FIG. 7) wherein the elongated valve element is fully retracted into the elongated body element and does not extend outwardly therefrom.

A flexible seal element in the form of a cup seal 32 formed of resilient plastic, rubber or the like is affixed to the elongated valve element 30. The cup seal 32 includes a flexible seal wall 34 extending outwardly away from the elongated valve element and defining a cup-shaped recess 36 spaced from the elongated valve element.

The flexible seal wall 34 engages the elongated body element at the restricted passageway segment in a substantially fluid-tight manner when the elongated valve element is not in the fully retracted position. (See FIG. 7.)

Figure 6:
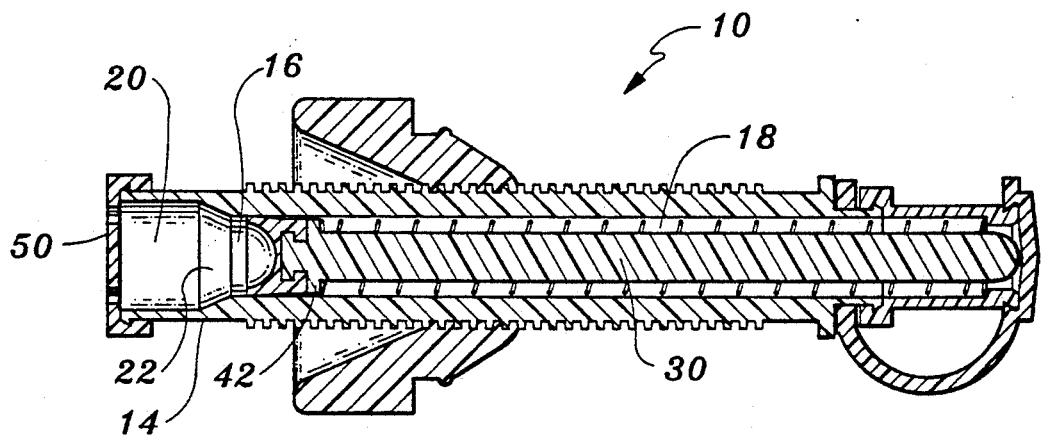
FIG. 6 is a sectional view taken along the line 6—6 in FIG. 1.

Normally, however, the elongated valve element and cup seal will occupy the position shown in FIG. 6 relative to the elongated body element in which the cup seal wall is in fluid-tight communication with the elongated body element within the restricted passageway segment 18.

A coil compression spring 40 is located within the elongated body element and engages a flange 42 comprising part of the elongated valve element. FIG. 6 shows the spring 40 in relaxed condition with no opposed forces existing between the spring and the elongated valve element.

Figure 8:
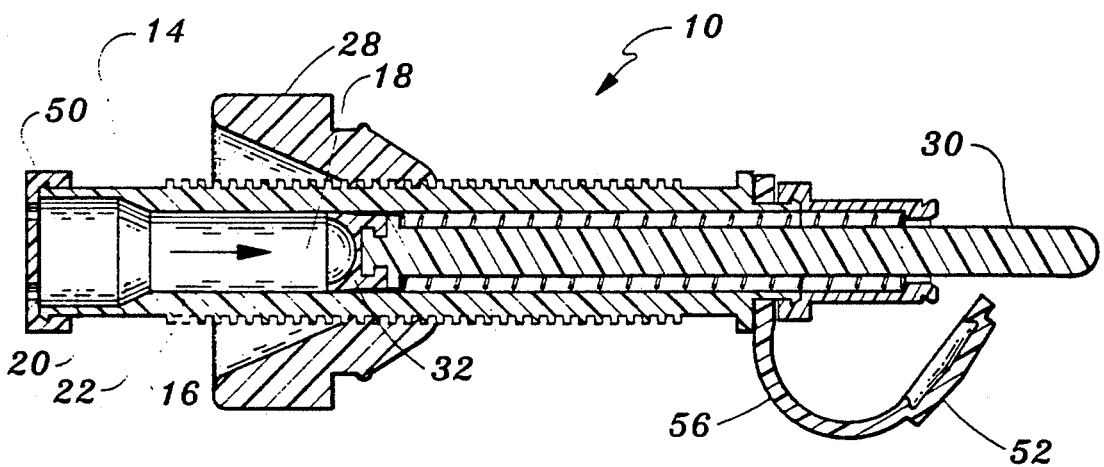
FIG. 8 is a view similar to FIG. 6, but showing the condition of the structural components of the apparatus when the apparatus is utilized to measure tire pressure.

FIG. 8 shows the elongated valve element and the cup seal displaced to the right against the bias exerted by the spring 40. This is the situation or condition which exits when the apparatus is being utilized to measure the pressure of a tire with which the apparatus is operatively associated. When the force exerted by the tire pressure on the cup seal 32 and elongated valve element 30 equals the bias force exerted by spring 40, a condition of equilibrium is reached and movement of the elongated valve element will cease. An observer will be able to read the indicia on the elongated valve element to determine the tire pressure.

Figure 7:
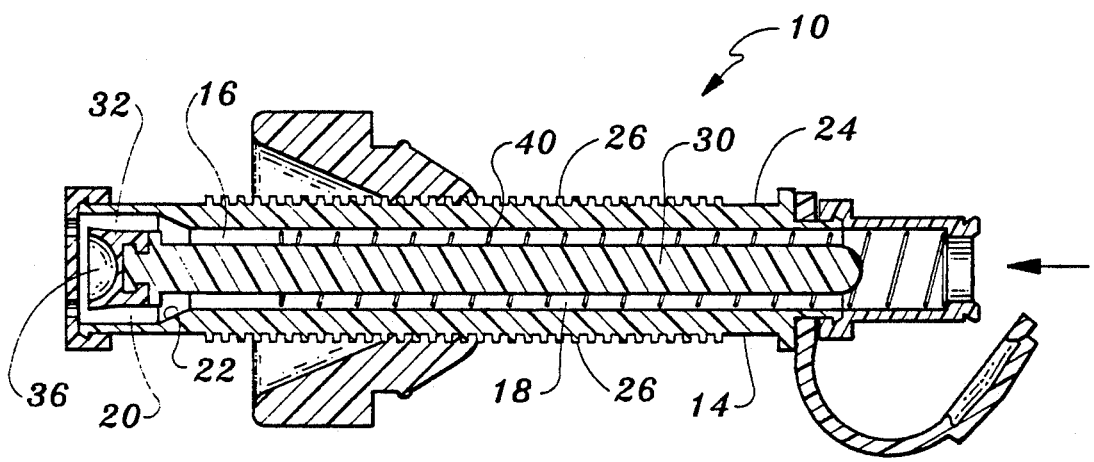
FIG. 7 is a view similar to FIG. 6, but illustrating the condition of the operative components of the apparatus when pressurized air is being utilized to fill a tire through the apparatus.

FIG. 7 shows the condition which results when a tire is being filled through the apparatus, and more particularly through the right end of the apparatus as viewed in FIG. 7. Filling is accomplished through a conventional tire filler nozzle (not shown) which is connected to the right end of the elongated body element 14. The influx of pressurized air will cause the elongated valve element 30 to be displaced to the left and the cup seal 32 to be positioned in the enlarged passageway segment 20. The seal defines an annular channel with the elongated body element when the seal is in its fully retracted position to allow the flow of pressurized air into the interior of the tire to which the elongated body element is connected through the elongated passageway. Removal of the filling nozzle will cause an air flow to proceed from the tire interior into the elongated passageway to urge the elongated valve element 32 to the right and the seal wall 34 into engagement with the elongated body element within the restricted passageway segment.

An end cap 50 defining a plurality of holes therein is connected to the elongated body element at the enlarged passageway segment. The holes provide fluid flow communication between the interior of a tire to which the elongated body element is connected and the elongated passageway. Securement between the end cap 50 and the elongated body element is accomplished by any desired expedient. In the arrangement shown, a snap fit exits between the end cap and the elongated body element.

An end closure 52 is provided at the other end of the elongated body element to cover that end when filling of the tire is not being accomplished or tire pressure check desired. The end closure 52 may be snap fit into place to push the projecting end of the elongated valve element into the confines of the elongated body element and maintain the elongated valve element in such position.

Preferably, means is provided for attaching the end closure to the elongated body element and retaining the end closure thereon when the end closure is not directly connected to the elongated body element. In the arrangement illustrated, such means comprises a ring member 54 which is located around the elongated body element and a strap 56 interconnecting the end closure 52 and ring member 54.

The elongated body element 14 is of multi-component construction and includes an end segment 60 snapped into place on the rest of the elongated body element with the ring member 54 secured in place therebetween.

This is an important feature. When the apparatus is assembled, the spring 40 bears against end segment 60 to maintain the spring in position in the elongated body element. When the end segment 60 is removed, the elongated valve element 30, cup seal 32, and spring 40 readily can be removed from the elongated body element 14. This allows prompt repair and replacement of these structural elements. The replacement may be by the same or identical components or even by different components. For example, a heavier duty spring and an elongated valve element indicating a higher range of pressures may be inserted to adapt the apparatus for use with a higher pressure tire. Also, the elongated valve element, the cup seal, and the spring can be temporarily removed to allow free and rapid flow of pressurized air into a tubeless tire being installed on a rim to facilitate the operation and ensure an effective seal between tire and rim.

I claim:

1. Apparatus for inflating a tire connected to a tire rim and indicating the pressure of said tire while the tire in on said rim, said apparatus comprising, in combination;

an elongated body element having an outer cylindrical surface for connection with said tire rim and defining an elongated passageway leading from the interior of the tire to which said elongated body element is connected to the ambient atmosphere;

an elongated valve element having indicia thereon slidably disposed within said elongated passageway and moveable between an extended position wherein said elongated valve element extends at least partially out of said elongated body element to display the indicia on said elongated valve element and a fully retracted position wherein said elongated valve element is fully retracted into said elongated body element and does not extend outwardly therefrom;

seal means attached to said elongated valve element, said seal means engaging said elongated body element when in said extended position and disengaged from said elongated body element when in said fully retracted position;

spring means within said elongated body element operatively associated with said elongated valve element for biasing said elongated valve element against movement toward said extended position;

tire rim mounting means extending about the other cylindrical surface of said elongated body element and selectively moveable along at least a portion of the length of said elongated body element; and securement means for securing said mounting means at a predetermined location along the length of said elongated body element, said securement means including a plurality of spaced detents extending along at least a portion of the length of said elongated body element for frictionally engaging said securement means.

2. The apparatus according to claim 1 wherein said elongated passageway includes a restricted passageway segment and an enlarged passageway segment, said seal means being located within the confines of said enlarged passageway segment and defining an annular channel with the elongated body element when said seal means is in said fully retracted position to allow the flow of pressurized air into the interior of the tire to which said elongated body element is connected through said elongated passageway.

3. The apparatus according to claim 2 wherein said elongated valve element has two spaced ends and wherein said seal means comprises a flexible seal element affixed to one of said elongated valve element ends, said elongated valve element being displaced from said fully retracted position toward said extended position and said flexible seal element being brought into engagement with said elongated body element at the restricted passageway segment when the pressure of pressurized air in the tire to said elongated body element is connected exceeds the air pressure in the passageway at the other end of said elongated valve element.

4. The apparatus according to claim 3 wherein said flexible seal element comprises a cup seal affixed to said elongated valve element and including a flexible seal wall extending outwardly away from said elongated valve element and defining a cup-shaped recess spaced from said elongated valve element, said flexible seal wall engaging said elongated body element at the restricted passageway segment in a substantially fluid tight manner when said elongated valve element is not in said fully retracted position.

5. The apparatus according to claim 1 wherein said securement means comprises a resilient grommet.

6. The apparatus according to claim 5 wherein said spaced detents comprise a plurality of spaced ribs radiating outwardly from said elongated body element outer cylindrical surface.

7. The apparatus according to claim 1 additionally comprising an end closure releasably directly connectable to said elongated body element and attachment means attaching said end closure to said elongated body element and retaining said end closure thereon when said end closure is not directly connected to said elongated body element.

8. The apparatus according to claim 2 additionally comprising an end cap connected to said elongated body element at said enlarged passageway segment, said end cap defining at least one hole for providing fluid flow communication between the interior of a tire to which said elongated body element is connected and said elongated passageway.

9. The apparatus according to claim 1 wherein said elongated body element is of multi-component construction and includes an end segment selectively removable from the remainder of the elongated body element, said spring means, said elongated valve element and said seal means being readily removable from said elongated body element upon removal of said end segment.

* * * * *